United States Patent
Borsos et al.

(10) Patent No.: US 11,557,014 B2
(45) Date of Patent: Jan. 17, 2023

(54) REAL-TIME MANAGING EVACUATION OF A BUILDING

(71) Applicant: Telefonaktiebolaget LM Ericsson (publ), Stockholm (SE)

(72) Inventors: Tamas Borsos, Budapest (HU); Péter Hága, Budapest (HU); Zsófia Kallus, Budapest (HU); Zsolt Kenesi, Budapest (HU); Mate Szebenyei, Maglod (HU); Peter Vaderna, Budapest (HU); András Veres, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 306 days.

(21) Appl. No.: 16/765,909

(22) PCT Filed: Dec. 19, 2017

(86) PCT No.: PCT/EP2017/083626
§ 371 (c)(1),
(2) Date: May 21, 2020

(87) PCT Pub. No.: WO2019/120491
PCT Pub. Date: Jun. 27, 2019

(65) Prior Publication Data
US 2020/0334784 A1 Oct. 22, 2020

(51) Int. Cl.
*G06Q 90/00* (2006.01)
*H04W 4/024* (2018.01)
(Continued)

(52) U.S. Cl.
CPC ....... *G06Q 90/205* (2013.01); *G06K 7/10306* (2013.01); *G06N 20/00* (2019.01);
(Continued)

(58) Field of Classification Search
CPC .. G01C 21/206; G06K 7/10306; G06N 20/00; G06Q 50/265; G06Q 90/205;
(Continued)

(56) References Cited

U.S. PATENT DOCUMENTS 8,751,265 B2 6/2014 Piett et al.
9,799,205 B2 * 10/2017 Wedig .................. G01C 21/206
(Continued)

FOREIGN PATENT DOCUMENTS

CN 105392726 A 3/2016
CN 206133827 U 4/2017
(Continued)

OTHER PUBLICATIONS

Helbing, D. et al., "Simulating Dynamical Features of Escape Panic", Nature, vol. 407, Sep. 28, 2000, pp. 487-490, Macmillan Magazines Ltd.
(Continued)

*Primary Examiner* — Kashif Siddiqui
(74) *Attorney, Agent, or Firm* — Coats & Bennett, PLLC

(57) ABSTRACT

The present disclosure relates an evacuation management system, EMS, (40, 52, 60, 00, 200) operative to provide real-time evacuation information for evacuation of a building, triggered by alarm notification (S202). Based on determined (S214) precise real-time positions of personal ultra-wide band, UWB, devices, as determined by UWB real-time localization system, RTLS, a controller determines (S210) evacuation plans being personal UWB device specific in real-time. Based on individual evacuation plans and input from building facilities, real-time guidance information is defined (S208) and sent to each personal UWB device, providing guidance to person carrying said personal UWB device, in what direction to move (S212), to reach a safe area. Based on localization signals the UWB RTLSA then
(Continued)

calculates updated positions of the personal UWB devices and sends to the evacuation management system. It is an advantage that trapped or injured people can be found, even in low visibility areas.

14 Claims, 4 Drawing Sheets

(51) Int. Cl.
| | |
|---|---|
| *H04W 4/33* | (2018.01) |
| *H04W 4/029* | (2018.01) |
| *H04W 4/90* | (2018.01) |
| *H04W 76/50* | (2018.01) |
| *G06N 20/00* | (2019.01) |
| *G06K 7/10* | (2006.01) |
| *G08B 7/06* | (2006.01) |
| *G08B 21/02* | (2006.01) |
| *G08B 25/00* | (2006.01) |

(52) U.S. Cl.
CPC ............ *G08B 7/066* (2013.01); *G08B 21/02* (2013.01); *G08B 25/001* (2013.01); *H04W 4/024* (2018.02); *H04W 4/029* (2018.02); *H04W 4/33* (2018.02); *H04W 4/90* (2018.02); *H04W 76/50* (2018.02)

(58) Field of Classification Search
CPC ...... G08B 21/02; G08B 25/001; G08B 7/066; H04W 4/024; H04W 4/029; H04W 4/33; H04W 4/90; H04W 76/50
See application file for complete search history.

(56) References Cited

U.S. PATENT DOCUMENTS

| | | | | |
|---|---|---|---|---|
| 2008/0062167 | A1* | 3/2008 | Boggs | G06T 19/00 |
| | | | | 345/419 |
| 2009/0138353 | A1* | 5/2009 | Mendelson | H04W 4/33 |
| | | | | 342/463 |
| 2009/0247116 | A1* | 10/2009 | Sennett | H04W 4/90 |
| | | | | 455/404.2 |
| 2009/0270065 | A1* | 10/2009 | Hamada | G08B 7/066 |
| | | | | 455/404.1 |
| 2009/0281850 | A1 | 11/2009 | Bruce et al. | |
| 2011/0136463 | A1* | 6/2011 | Ebdon | G01C 21/206 |
| | | | | 455/404.1 |
| 2015/0137967 | A1* | 5/2015 | Wedig | G08B 25/016 |
| | | | | 340/501 |
| 2015/0348220 | A1 | 12/2015 | Sharma et al. | |
| 2017/0124842 | A1* | 5/2017 | Sinha | A61M 5/1723 |
| 2022/0053292 | A1* | 2/2022 | Hoff | H04W 4/029 |

FOREIGN PATENT DOCUMENTS

| | | |
|---|---|---|
| KR | 20120031787 A | 4/2012 |
| KR | 20140114477 A | 9/2014 |
| WO | 2009151166 A1 | 12/2009 |
| WO | 2015057187 A1 | 4/2015 |
| WO | 2015183427 A1 | 12/2015 |

OTHER PUBLICATIONS

Moussaïd, M. et al., "How Simple Rules Determine Pedestrian Behavior and Crowd Disasters", Proceedings of the National Academy of Sciences of the United States of America (PNAS), vol. 108 No. 17, Apr. 26, 2011, pp. 6884-6888, PNAS.

* cited by examiner

REAL-TIME MANAGING EVACUATION OF A BUILDING

TECHNICAL FIELD

This disclosure relates to managing evacuation of a building. In more particular, it relates to an evacuation management system, a method performed therein, an evacuation system, a computer program as well as a computer-readable storage medium for real-time managing evacuation of a building.

BACKGROUND

Evacuation systems that are installed in offices and other buildings are based on emergency buttons initiating an alarm and emergency signs showing an evacuation route from a specific location. Emergency signs are typically off-line, i.e. not connected to any network, and can show the direction of a pre-defined evacuation route.

KR2012031787A presents recording location of service men in a secure area. A security and management system within a smart building capable of monitoring access to people in real time by using a real time locating system.

U.S. Pat. No. 8,751,265B2 presents location-based information for emergency management, capable of notifying people in an emergency area.

KR20140114477A discloses a method for providing emergency management service by using machine-to-machine communication. This involves providing digital network resource of an integrated service from wearable-type terminal to server when a user is in emergency; to monitor health values with a wearable terminal having machine-to-machine communication capability.

There are several studies discussing properties and design of the optimal evacuation strategies and the movement of people or pedestrians in various building layouts.

Prior-art connected techniques also focus on notifying and monitoring the health of people when being inside or near to an emergency, but to the best of our knowledge, fail to give up-to-date information to these people to help them to get out of the dangerous area.

There is a demand for a technique with which individual-specific evacuation plans can be defined, taking into account real-time progression of the emergency.

SUMMARY

It is an object of embodiments of the disclosure to address at least some of the issues outlined above, and this object and others are solved an evacuation management system, a method performed therein, an evacuation system, a computer program and a computer-readable storage medium for providing real-time evacuation information for evacuation of a building.

According to an aspect, the present disclosure provides a method of providing real-time evacuation information for evacuating a building. The method is performed by an evacuation management system that is connected to an ultra-wide band real-time localization system. The method comprises receiving an alarm notification associated with the building, and obtaining information about facilities within the building. The method also comprises receiving position information of a plurality of personal ultra-wide band devices from the ultra-wide band real-time localization system. While there are personal ultra-wide band devices in the building, based on the received position information, the method also comprises determining evacuation plans specific to each personal ultra-wide band device in the building, based on the received position information of the plurality of personal ultra-wide band devices, and the obtained information about the facilities within the building. While there are personal ultra-wide band devices in the building, the method also comprises defining real-time guidance information specific to each personal ultra-wide band device in the building, said information comprising real-time guidance in which direction to move, based on the evacuation plans being specific to each personal ultra-wide band device in the building. While there are personal ultra-wide band devices in the building, based on the received position information, the method also comprises sending said real-time guidance information via the ultra-wide band real-time localization system to the personal ultra-wide band devices in the building, providing individual guidance, to a person carrying a personal ultra-wide band device in the building, in which direction to move. While there are personal ultra-wide band devices in the building, based on the received position information, the method also comprises iterating the actions in this paragraph until all persons carrying a personal ultra-wide band device have reached a safe place, based on updated position information of each personal ultra-wide band device.

According to another aspect, the present disclosure provides an evacuation management system that is operative to provide real-time evacuation information for evacuation of a building. The evacuation management system is adapted to be connected to an ultra-wide band real-time localization system that monitors the location of personal ultra-wide band devices. The evacuation management system comprises an interface that is adapted to receive an alarm notification associated with the building, to obtain information about facilities within the building and to iteratively receive position information of a plurality of personal ultra-wide band devices from the ultra-wide band real-time localization system. The evacuation management system also comprises a controller that is adapted to iteratively determine whether there are personal ultra-wide band devices in the building, based on the position information, and while there are personal ultra-wide band devices in the building, the controller is also adapted to iteratively determine evacuation plans specific to each personal ultra-wide band device in the building, based on the received position information of the plurality of personal ultra-wide band devices, and the obtained information about the facilities within the building. While there are personal ultra-wide band devices in the building, the controller is also adapted to iteratively define real-time guidance information specific to each personal ultra-wide band device in the building, said information comprising real-time guidance in which direction to move, based on the evacuation plans being specific to each personal ultra-wide band device in the building. The interface is further adapted to iteratively send said real-time guidance information via the ultra-wide band real-time localization system to the personal ultra-wide band devices in the building, thereby providing individual guidance, to a person carrying a personal ultra-wide band device in the building, in which direction to move.

According to another aspect, the disclosure provides an evacuation management system that is operative to provide real-time evacuation information for evacuation of a building. The evacuation management system is adapted to be connected to an ultra-wide band real-time localization system that monitors the location of a plurality of personal ultra-wide band devices. The evacuation management system comprises a processing circuit and a memory. The memory has instructions executable by the processing circuit, wherein said processing circuit when executing said instructions is configured to receive an alarm notification associated with the building. The processing circuit, when executing said instructions, is also configured to obtain information about facilities within the building, and to receive position information of a plurality of personal ultra-wide band devices from the ultra-wide band real-time localization system. While there are personal ultra-wide band devices in the building, based on the received position information, the processing circuit, when executing said instructions, is also configured to determine evacuation plans specific to each personal ultra-wide band device in the building, based on the received position information of the plurality of personal ultra-wide band devices, and the obtained information about the facilities within the building. While there are personal ultra-wide band devices in the building, the processing circuit, when executing said instructions, is also configured to define real-time guidance information specific to each personal ultra-wide band device in the building, said information comprising real-time guidance in which direction to move, based on the evacuation plans being specific to each personal ultra-wide band device in the building, and to send said real-time guidance information via the ultra-wide band real-time localization system to the personal ultra-wide band devices in the building, providing individual guidance, to a person carrying a personal ultra-wide band device in the building, in which direction to move. While there are personal ultra-wide band devices in the building, the processing circuit, when executing said instructions, is also configured to iterate the actions in the present paragraph until all persons carrying a personal ultra-wide band device have reached a safe place, based on updated position information of each personal ultra-wide band device.

According to yet another aspect, the disclosure provides a computer program for providing real-time evacuation information for evacuation of a building. The computer program comprises instructions which, when executed on at least one processor, cause the at least one processor to carry out the method according to aspects as described above.

According to yet another aspect, the disclosure provides a computer-readable storage medium, having thereon said computer program.

The following advantages are provided by embodiments of the present disclosure.

The proposed evacuation management system may provide a real-time overview of a current emergency situation, in the form of the location of anybody, or anything, carrying the personal ultra-wide band devices. It is a further advantage that the evacuation management system can be informed about the status of people carrying personal ultra-wide band devices.

In case of evacuation, the evacuation management system may guide people in their movement inside a building by providing guidance information to the personal ultra-wide band devices, giving directions in which direction to move. In this respect, the movement of people may be considered to be controlled in real-time.

It is also advantageous that the proposed personal device has several options to inform the management system about the status of the carrying human.

The personal device helps the people get out from the danger zone, by navigating them by voice or visual interface.

The personal ultra-wide band devices serve as radio beacons that helps rescue team to find people. The device also equipped with light and sound alarms to call attention.

BRIEF DESCRIPTION OF THE DRAWINGS

Embodiments will now be described in more detail, and with reference to the accompanying drawings, in which.

DETAILED DESCRIPTION

Figure 1:
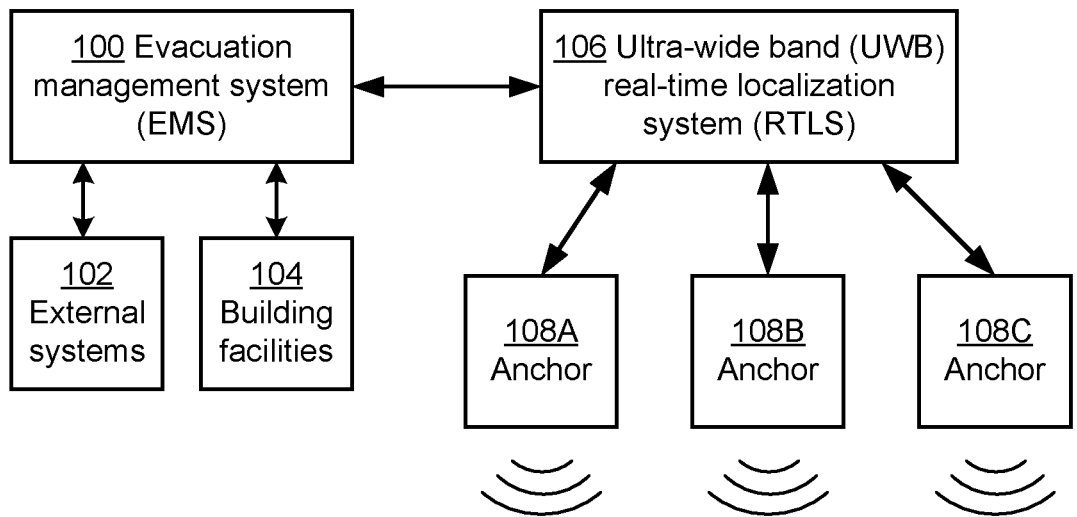
FIG. 1 illustrates an architecture that is related to embodiments of the present disclosure.
Figure 1:
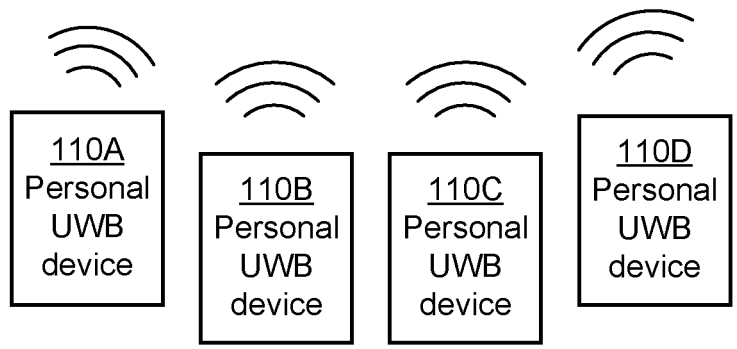

In the following description, different embodiments of the disclosure will be described in more detail, with reference to accompanying drawings. For the purpose of explanation and not limitation, specific details are set forth, such as particular examples and techniques in order to provide a thorough understanding.

As mentioned above, prior art connected techniques focus on notifying and monitoring the health of people when being inside or near to an emergency, but to the best of our knowledge, fail to give up-to-date information to these people to help them to get out from the dangerous area. Prior-art emergency signs are typically off-line, i.e. not connected to any network, and can show the direction of a pre-defined evacuation route. Pre-defined evacuation routes have no possibility to show situation aware real-time information, which may well be crucial in emergencies.

It would be advantageous with a solution with which movement of people would be possible to guide, and to monitor which speed and direction people are moving. It would also be an advantage with a solution with which trapped or injured people could be found, even in low visibility areas.

The present disclosure comprises an evacuation management system. The evacuation management system together with a real-time localization infrastructure that has personal devices associated, successfully provides real-time evacuation information for evacuation of a building.

The personal devices are used as an information sharing equipment between anyone, or even anything, carrying these devices and the evacuation management system.

By carrying these devices, they may send relevant information about the location of the carrier, about the emergency case and the status of the carrier to the management system. In response, having defined an individual evacuation plan, the evacuation management system may send information about tasks to perform, such as where to move in the form of real-time guidance following an optimal real-time evacuation route.

The personal devices are operative in an ultra-wide band, meaning that they are configured to receive and transmit signals at a very wide range of radio frequencies.

The real-time localization infrastructure comprises an ultra-wide band (UWB) real-time localization system (RTLS). This UWB RTLS solution is configured to determine precise locations (about 1 m inaccuracy) of personal devices, being personal UWB devices, and sends this precise location information to the evacuation management system.

It is emphasized that UWB RTLS is a solution designed for precise position determination using radio techniques, and is not designed for communication of large amounts of data. Nevertheless, the same UWB radio channel that is used for the position determination can be used as a communication channel for limited amount of data between the personal UWB devices and the evacuation management system. This opens up a possibility to send signals and shorter messages from the evacuation management system to personal UWB devices.

It should be clearly pointed out that, the present disclosure relates to managing evacuation for evacuating a building, i.e. in-door. The usage of positioning systems such as global positioning system (GPS) is thus not possible.

The evacuation management system may collect various input information, such as information from the UWB RTLS and from the personal UWB devices, but also from other emergency-related systems. Such input information is collected to enable analyzes of the current situation and decide on actions to be taken in real-time. The present disclosure comprises communicating to the personal UWB device devices and to external parties, such as rescue, police, etc.

The proposed evacuation management system provides a real-time overview of a current emergency situation, in the form of the location of anybody, or anything, carrying personal UWB devices.

It is a further advantage that the evacuation management system can be informed about the status of people carrying personal UWB devices.

In case of evacuation, the evacuation management system typically guides people in their movement inside a building by providing guidance information to the personal UWB devices, giving directions in which direction to move. In this respect, the movement of people may be considered to be controlled in real-time.

It is also advantageous that the evacuation management system can be informed about the status of the people carrying the personal UWB devices, and that there are several alternatives and options to deliver such information.

The personal UWB devices may moreover receive information in the form of voice information or information to be presented by visual interfaces, to be presented to the person carrying the personal UWB device. This would effectively assist people in finding their way to a safe place, and/or out of a building, thereby leaving emergency and/or danger zones.

The personal UWB devices, together with anchors with which they are communicating, serve as radio beacons that help rescue team to locate and find people within a building.

Information reaching the personal UWB devices may also be presented with light and/or sound alarms to call the attention or a person carrying said personal UWB device.

It is also an advantage that crowding or hindrance near or at emergency exits can be circumvented, by individually guiding people along functioning routes out of a building.

FIG. 1 illustrates an architecture that is related to embodiments of the present disclosure. An evacuation management system (EMS) 100 may receive an alarm notification from external systems 102 and receive information about building facilities 104. The building facilities may comprise smoke sensors, alarms, automatic doors, etc., which may change their state during a developing emergency. For instance, automatic doors may be activated to close upon detection of smoke.

The EMS 100 is adapted to communicate an ultra-wide band (UWB) real-time localization system (RTLS) 10, which has associated anchors 108A-C and a plurality of personal UWB devices 110A-D. The personal UWB devices are adapted to receive guidance information from the UWB RTLS 106, via the anchors, which guidance information is designed to assist a person carrying a personal UWB device to move towards a safe place. The anchors are adapted to measure the distance to each personal UWB device 110A-D and send real-time location information to the UWB RTLS 106. The UWB RTLS is then adapted to determine whether all persons are safe, and if not, updates personal UWB device specific guidance information and sends said personal UWB device specific information to personal UWB devices still present in the building.

It is noted that communication between the anchors 108A-C and personal UWB device 110A-D may be performed through a secure Internet protocol (IP) channel or a radio channel.

The personal UWB devices are preferably placed in easily accessible areas in a building, such as halls, meeting rooms, corridors, public areas, such that persons when, for instance entering the building, can easily access a personal UWB device and to keep carrying said personal UWB device while being inside the building. The personal UWB devices may alternatively be connected to a carrying person's smartphone. In this way personal UWB devices may be connected to the EMS by a wireless communication technology, such as WiFi, or mobile communication systems of various generations.

Personal UWB devices may activated by simply removing the personal UWB device from its stand. This is applicable in case there is a common device pool. Activation may also trigger an alarm event in the EMS.

Activation may also be performed by starting a smart phone application and initiating an alarm. Buttons or keys when present on personal UWB devices, or the application, may be used on the personal UWB device to indicate what type of emergency is present. Emergency examples comprise fire, injured person, etc. Personal UWB devices may also be used to send status information about of the person carrying said personal UWB device. Such status information may serve as input information for determination of evacuation plans performed by the EMS.

The personal UWB devices, and hence the people carrying the personal UWB devices, are subjected to precise positioning, in the sense that their position is determined precisely, by the localization infrastructure comprising the UWB RTLS.

The personal UWB devices serve as radio beacons in real-time localization of the devices and the carrying people.

It is an advantage that radio communication is used, since the evacuation management system, as disclosed herein, in fully functional in poor visibility areas.

Alarm signals may be turned on by the personal UWB devices, triggered by a carrying person falling or detection of a button being pressed. The alarm signal may be presented visually or with a sounding alarm. Triggered by alarms turned on by local personal UWB devices, the EMS may be immediately notified.

Personal UWB devices may further be equipped with an "I am safe"-button that, when pressed, notifies the EMS, that the person carrying a certain personal UWB device has reached a safe place, and/or left the building.

Various personal UWB devices are envisaged.

One type of personal UWB devices comprises a handheld device comprising a localization tag, a processing unit and a screen. Such a personal UWB device may be considered to be all-in-one tool or device, which can be used without any external device, such as a smartphone. Such an all-in-one tool, may hence comprise user interface (UI) functionalities built-in to the personal UWB device.

Another type of personal UWB devices comprise a localization tag that may be a stand-alone tool, or may be integrated with other personal belongings, such as a personal badge, an entry ticket to a mass event. In such a case, UI functionalities may be provided by a smartphone application connectable via Bluetooth, near-filed communication (NFC) or other technologies. This type of personal UWB device may be used even in mass events, at which a lot of people participate.

A further type of personal UWB device comprise a localization tag that is integrated with special clothing, such as a safety vest or jacket, where UI functionalities may be integrated into the clothing in the form of, for instance, active light components, or can be provided by a smartphone application.

The localization infrastructure uses real-time localization system (RTLS) technology, to determine precise positions of personal UWB devices. As shown in FIG. 1, the localization infrastructure uses a central localization system, being the ultra-wide band (UWB) RTLS, and anchors 108A-C installed to create RTLS coverage in a building. The anchors and personal UWB devices 110A-D measure radio propagation delay in communication between the two, to determine the distance between the two. Knowing the distance between the two, and the position of pre-set anchors, precise positioning of personal UWB devices can thus be achieved. This positioning information is then shared with the EMS 100.

Figure 2:
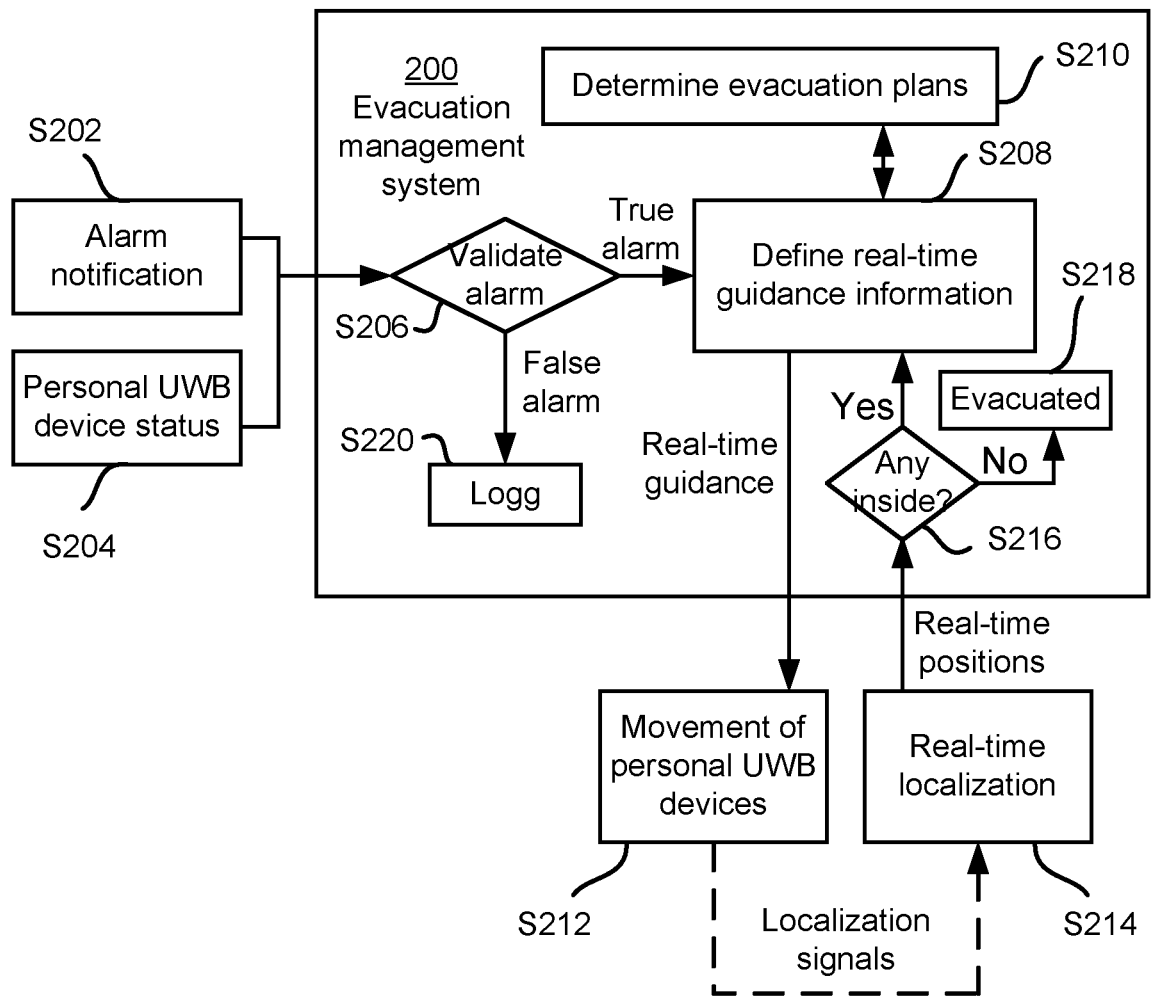
FIG. 2 is schematic presentation of functions in an example according to the present disclosure.

FIG. 2 is schematic presentation of functions in an embodiment of the present disclosure, in connection with an illustrated evacuation management system 200.

The evacuation management system 200 may determine necessary actions to be performed based on received input information. Such input information may comprise receiving alarm notifications S202 and receiving personal UWB device status S204. Input information is also received from the personal UWB devices in the form of the location of the personal UWB devices. As mentioned above, information from building facilities may also be obtained, when read from a storage, such a database, or freshly received from sensors, such as smoke sensors, alarms, automatic doors, automatic windows, etc.

Examples of necessary action to be performed are alarming the entire building, call medical assistance, order an emergency evacuation, etc. For this reason, the EMS may also be adapted to be connected to the police, fire departments, ambulance and others.

Upon alarm notification, the alarm notification or the alarm itself may be subjected to validation S206. The evacuation management system here determines whether the alarm notification, or the alarm itself, is real, i.e. a true alarm, or a false alarm. Validation may be performed by checking presence of anomalies in the information received from built-in sensors and various alarms. Validation may alternatively, be performed by requesting a confirmation from a person raised an alarm in the case of a medical emergency, or an active shooter situation, wherein information from a number of sensors may be normal. Validation may also be performed by requesting a security staff to confirm the notified emergency by checking a closed-circuit television (CCTV) system or by visiting the area in question.

If the alarm is a false alarm, the EMS 200 logs S220 all information and data received, without forwarding the alarm notification to alarm others in the building.

In the case of a true alarm, the EMS determines S210 evacuation plans specific to all personal UWB devices. It is noted that logging of data may also be performed in case of true alarm notifications. Initially, if the EMS 200 is not aware of the location of the personal UWB devices, the EMS may send information to prepare a person carrying a personal UWB device for an emergency situation, possibly for evacuation of the building. Upon receiving localization signals from the personal UWB devices by the UWB RTLS, real-time positions of each personal UWB device is determined S214 by the UWB RTLS. The after position information is sent to the EMS 200, based on which real-time guidance information may be determined, S208.

The EMS may now determine real-time evacuation plans being specific to each personal UWB device.

The EMS may here determine real-time evacuation plans to be followed in each particular emergency situation. In case of a fire, or an earthquake, a loud sounding alarm may be initiated throughout the building to communicate that an emergency evacuation has started. However, for other emergency cases, for instance, in medical emergency involving only a single, or limited number of persons, evacuation of the entire building may be decided not to be necessary. Determination of evacuation plans may be based on human interaction, for instance based on information from emergency experts, and may be stored in the EMS 200, for instance in a database.

The EMS may also alarm external emergency services, such as ambulance, police, fire department, etc., in the case their assistance is considered to be required in each particular situation. This information may be communicated via a secure communication link, such as through a secure IP or radio channel.

In case of true alarm, an alarm sound may be turned on to notify people involved about the on-going emergency, and, if not already wearing or carrying a personal UWB device, to collect a dedicated or a spare personal UWB device.

In order to calculate required actions to be performed, the EMS 200 considers the particular type of emergency. The EMS may also consider location of known danger zones, possibly obtained from historical information from a database, about potentially damaged evacuation routes.

The EMS 200 retrieves via an UWB RTLS the location of all personal UWB devices, and determines S216 whether there is anyone still inside the building, or in another area to be evacuated, based on real-time localization information. If there is anybody remaining in the building or in said area, the real-time guidance information is defined, based on the received real-time localization information. Also, by real-time localization information of personal UWB devices, information about people moving in erroneous directions inside a building, or in-door area may be gained. If it is decided that no personal UWB device remains in the building, it is concluded that the building is evacuated S218.

When it is decided to evacuate a building, the evacuation management system 200 may determine a personal UWB device-specific optimal route. An optimal route may be the fastest route or the safest route, dependent on each particular situation.

The determination of each evacuation plan is performed dynamically for each personal UWB device still within the area to be evacuated. Real-time guidance information is thus defined S208 which information is sent to each respective personal UWB device in the area. This guidance information comprises guidance for guiding a person carrying the personal UWB device to move S212 in a safe direction. The guided direction may be a weighted combination of safety and closeness, dependent on the danger of the emergency. If the danger is determined to rapidly increase, a potentially faster route may be chosen for evacuation, rather than a momentarily safe and more time-consuming route. Human interaction and considerations may be valuable in particular cases, in which for instance, complex input information is received or when a danger zone is moving, such as in the case of a rapid fire, an active shooter or a terrorist attack.

For each specific personal UWB device, the EMS may be adapted to determine an optimal evacuation route which may be presented on a screen of said personal UWB device. Since the guidance information being presented is being presented in real-time, it is not necessary to present an entire evacuation route at once. Rather, a single direction in which to move may be preferred. This should be sufficient for each person in an emergency situation since the direction is updated in real-time for which reason the direction of the guidance information will always point in an intended direction to move, to reach a safe place, and/or evacuate the building.

Overall guidance information may be presented as a map, visual navigation directions, sound/voice based navigation, tactile navigation based on activation of a built-in vibrator etc.

As indicated above, the closest way or route may not be safest, and in each particular case a consideration may be performed to determine an evacuation plan, based on which to define real-time guidance information to communicate to each specific personal UWB device.

Determination of evacuation plans may be performed using an analytics engine using advanced analytics methods, such as machine learning. Machine learning may collect learning data during evacuation practices, during true emergency events, or in everyday movement of people. The analytics engine may also perform historical data analysis, pattern recognition, use navigation algorithms, taking into account lay-outs and construction plans of the building, etc.

Historical input data may be available from a database where said relevant information is stored for each situation during practice alarms, or everyday human movement or when the personal UWB devices, for instance, in the form of location tags, are carried by a person. Based on the calculations a decision may be taken about required actions being proposed. The actions may be supported or overridden by a human operator, via input received from said human operator, before real-time guidance information is communicated to personal UWB devices still within the building or the area to be evacuated.

All personal UWB devices participating in the evacuation are monitored, and it is determined in real-time whether they are already located in safe place, or not. Special attention is given to persons, based on personal UWB devices still in danger or within an un-safe area.

A loop comprising definition of real-time guidance information in S208, followed by causing movement of personal UWB devices S212, via localization signals, to real-time localization in S214, and determining whether any personal UWB devices are still in the area to be evacuated, in S216, is preferably calculated and updated at a frequency high enough to provide real-time guidance information to people carrying the personal UWB devices. The loop is typically also calculated with a low latency to maintain carrying people updated about the direction in which to move.

It is noted that the UWB RTLS and the EMS itself may be located in an external place, outside the building or area in question. In such a way the UWB RTLS as such may be protected against the actual emergency. The anchors associated with the UWB RTLS, however, need to be locally positioned, in order to measure the distance, from said anchors, to the personal UWB devices. Based on precise knowledge of each anchor position, precise locations of each personal UWB device can be calculated, for which reason the location of each person carrying such a personal UWB device can be determined.

As indicated above, information and data of emergency situations, such as observed events, measured metrics and determinations and decisions made within the evacuation management system may be logged.

The personal UWB devices are preferably carried one per each person, with exceptions to children, older people, and people being disabled, in which cases persons in charge of said people would also have to assist these to safety.

Figure 3:
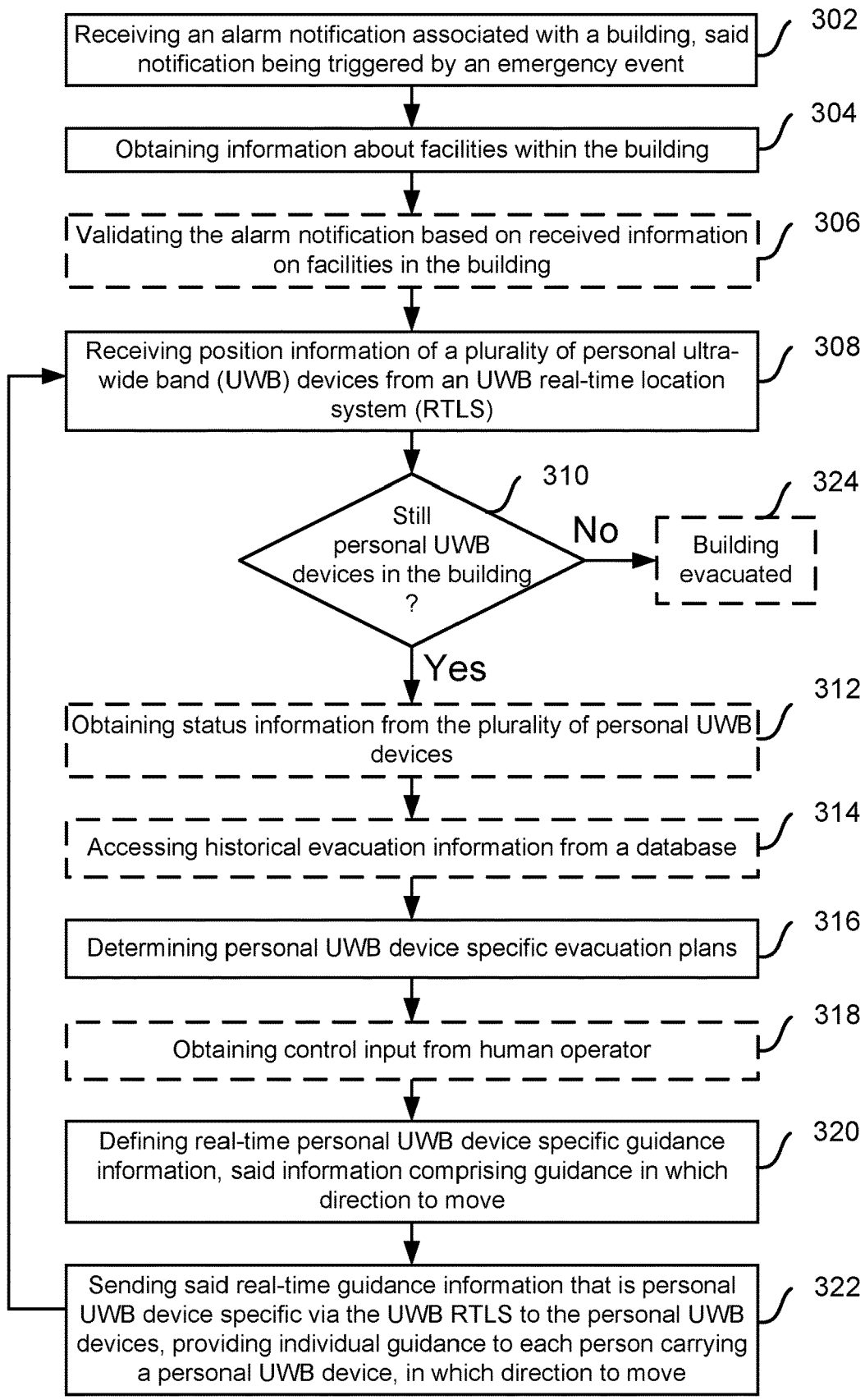
FIG. 3 is a flow chart of actions of a method according to embodiments of the present disclosure.

FIG. 3 is a flow chart of actions of a method of providing real-time evacuation information for evacuating a building, according to embodiments of the present disclosure. The method is performed by an evacuation management system (EMS) that is connected to an ultra-wide band (UWB) real-time localization system (RTLS).

The method comprises the following actions:

Action 302: Receiving an alarm notification associated with the building, where said notification may be triggered by an emergency event.

Action 304: Obtaining information about facilities within the building

Action 306: The method may optionally comprise validating the alarm notification based on the received information on facilities in the building.

Upon validating the received alarm notification, the method may further comprise forwarding said alarm notification to one or more emergency services.

Action 308: Receiving position information of a plurality of personal UWB devices from the UWB RTLS.

Action 310: Determining whether any personal UWB devices remain in the building, based on the received position information, and answering "Yes".

Action 312: The method may optionally comprise obtaining status information from the plurality of personal UWB devices.

Action 314: The method may optionally comprise accessing historical evacuation information from a database.

Action 316: Determining evacuation plans specific to each personal UWB device in the building, based on the received position information of the plurality of personal UWB devices, and on the obtained information about the facilities within the building. Determining evacuation plans may also be based on the status information obtained from the plurality of UWB devices, and on the historical evacuation information as accessed from the database.

Action 318: The method may optionally comprise obtain control input from a human operator.

Action 320: Defining real-time guidance information specific to each personal UWB device in the building, said information comprising real-time guidance in which direction to move, based on the evacuation plans being specific to each personal UWB device in the building, and optionally on control input obtained from a human operator.

Action 322: Sending said real-time guidance information via the UWB RTLS to the personal UWB devices in the building, providing individual guidance, to a person carrying a personal UWB device in the building, in which direction to move.

The method also comprises iterating actions 304, 308, 316, 320 and 322 until all persons carrying a personal UWB device have reached a safe place, based on updated position information of each personal UWB device.

Action 324: Concluding that the building is evacuated based on action 310 of determining whether any personal UWB devices remain in the building, based on the received position information, and answering "No".

Figure 4:
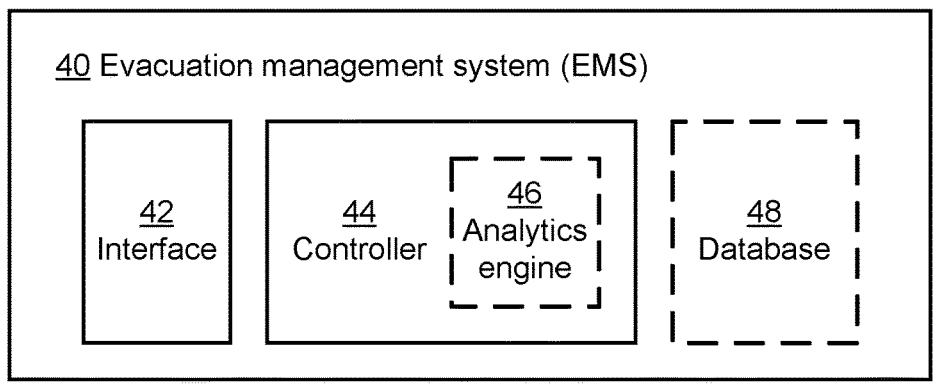
FIGS. 4 and 6 present an evacuation management system, according to embodiments of this disclosure.

FIG. 4 presents an evacuation management system (EMS) 40, 100, 200 being operative to provide real-time evacuation information for evacuation of a building. The evacuation system is adapted to be connected to an ultra-wide band (UWB) real-time localization system (RTLS) that monitors the location of personal UWB devices. The EMS 40 comprises an interface 42 and a controller 44. The interface is adapted to receive an alarm notification associated with the building, to obtain information about facilities within the building and to iteratively receive position information of a plurality of personal UWB devices from the UWB RTLS. The controller 44 that is adapted to iteratively determine whether there are personal UWB devices in the building, based on the position information, and while there are personal UWB devices in the building, the controller is also adapted to iteratively determine evacuation plans specific to each personal UWB device in the building, based on the received position information of the plurality of personal UWB devices, and the obtained information about the facilities within the building. While there are personal UWB devices in the building, the controller is also adapted to iteratively define real-time guidance information specific to each personal UWB device in the building, said information comprising real-time guidance in which direction to move, based on the evacuation plans being specific to each personal UWB device in the building. The interface 42 is further adapted to iteratively send said real-time guidance information via the UWB RTLS to the personal UWB devices in the building, thereby providing individual guidance, to a person carrying a personal UWB device in the building, in which direction to move.

The interface 42 of the EMS 40, 100, 200 may also adapted to obtain status information from the plurality of personal UWB devices. The controller 44 may further be adapted to determine the evacuation plan based on said obtained status information from the plurality of personal UWB devices.

The controller 44 of the EMS 40, 100, 200 may also be adapted to validate the alarm notification based on the information obtained about facilities in the building. Upon validating the alarm notification, said controller 44 may also be adapted to forward the alarm notification to one or more emergency services.

The interface 42 of the EMS 40, 100, 200 may be adapted receive control input from a human operator. The controller 44 of the EMS 40, 100, 200 may further be adapted to define real-time guidance specific to each personal UWB device, based on the received control input from a human operator.

The EMS 40, 100, 200 may also comprise a database 48 that is adapted to store the information about facilities in the building, and to store position information of the plurality of personal UWB devices from the UWB RTLS. The controller 44 of the EMS 40, 100, 200 may also be adapted to access historical evacuation information from the database, and to determine the evacuation plans which are personal UWB device specific, based on the historical evacuation information.

The controller 44 of the EMS 40, 100, 200 may also comprise an analytics engine 46 adapted to perform machine learning.

The analytics engine 46 may also perform one or more of: historical data analysis, pattern recognition, usage of navigation algorithms, taking into account lay-outs and construction plans of the building.

Figure 5:
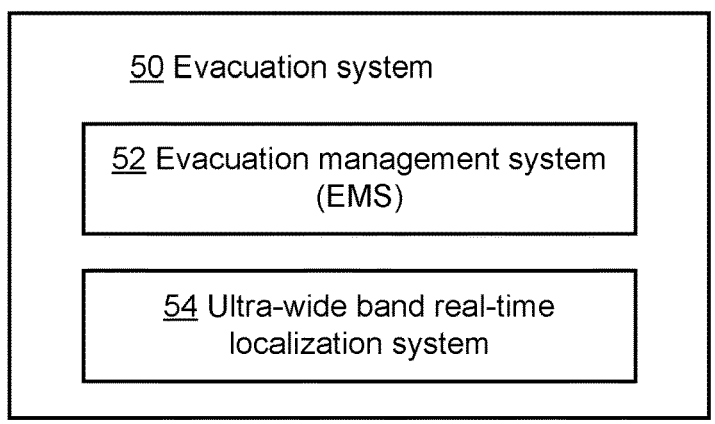
FIG. 5 schematically presents an evacuation system, according to embodiments of the present disclosure.

FIG. 5 schematically presents an evacuation system 50 operative to provide real-time evacuation information for evacuation of a building, according to embodiments of the present disclosure. The evacuation system 50 comprises an evacuation management system (EMS) 40, 52, 100, 200 and an ultra-wide band (UWB) real-time localization system (RTLS) 54. The UWB RTLS is adapted to be connected to the EMS 40, 52, 100, 200 wherein the UWB RTLS is adapted to monitor the location of the plurality of personal UWB devices. The EMS 40, 52, 100, 200 is operative to provide real-time evacuation information for evacuation of a building. The EMS 40, 52, 100, 200 comprises an interface 42 and a controller 44. The interface 42 is adapted to receive an alarm notification associated with the building, to obtain information about facilities within the building and to iteratively receive position information of a plurality of personal UWB devices from the UWB RTLS. The controller 44 that is adapted to iteratively determine whether there are personal UWB devices in the building, based on the position information, and while there are personal UWB devices in the building, the controller 44 is also adapted to iteratively determine evacuation plans specific to each personal UWB device in the building, based on the received position information of the plurality of personal UWB devices, and the obtained information about the facilities within the building. While there are personal UWB devices in the building, the controller 44 is also adapted to iteratively define real-time guidance information specific to each personal UWB device in the building, said information comprising real-time guidance in which direction to move, based on the evacuation plans being specific to each personal UWB device in the building. The interface 42 is further adapted to iteratively send said real-time guidance information via the UWB RTLS to the personal UWB devices in the building, thereby providing individual guidance, to a person carrying a personal UWB device in the building, in which direction to move.

Figure 6:
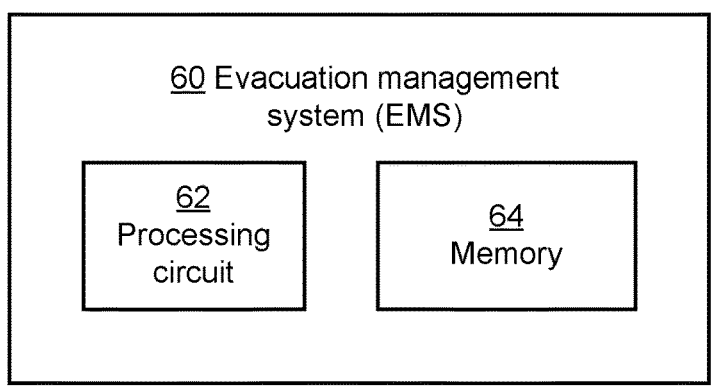

FIG. 6 presents an evacuation management system (EMS) 60 that is operative to provide real-time evacuation information for evacuation of a building, according to embodiments of the present disclosure. The EMS is adapted to be connected to an ultra-wide band (UWB) real-time localization system (RTLS) that monitors the location of a plurality of personal UWB devices. The EMS 40, 52, 60, 100, 200 comprises a processing circuit 62 and a memory 64. The memory 64 has instructions executable by the processing circuit 62, wherein said processing circuit 62 when executing said instructions is configured to receive an alarm notification associated with the building. The processing circuit 62 when executing said instructions is also configured to obtain information about facilities within the building, and to receive position information of a plurality of personal UWB devices from the UWB RTLS. While there are personal UWB devices in the building, based on the received position information, the processing circuit 62 when executing said instructions is also configured to determine evacuation plans specific to each personal UWB device in the building, based on the received position information of the plurality of personal UWB devices, and the obtained information about the facilities within the building. While there are personal UWB devices in the building, the processing circuit 62 when executing said instructions is also configured to define real-time guidance information specific to each personal UWB device in the building, said information comprising real-time guidance in which direction to move, based on the evacuation plans being specific to each personal UWB device in the building, and to send said real-time guidance information via the UWB RTLS to the personal UWB devices in the building, providing individual guidance, to a person carrying a personal UWB device in the building, in which direction to move. While there are personal UWB devices in the building, the processing circuit 62, when executing said instructions, is also configured to iterate the actions in the present paragraph until all persons carrying a personal UWB device have reached a safe place, based on updated position information of each personal UWB device.

The present disclosure also comprises an evacuation management system (EMS) 40, 52, 60, 100, 200 that is operative to provide real-time evacuation information for evacuation of a building, according to embodiments of the present disclosure. The EMS is adapted to be connected to an ultra-wide band (UWB) real-time localization system (RTLS) that monitors the location of a plurality of personal UWB devices. The EMS 40, 52, 60, 100, 200 is also adapted to receive an alarm notification associated with the building, to obtain information about facilities within the building, and to receive position information of a plurality of personal UWB devices from the UWB RTLS. While there are personal UWB devices in the building, the EMS 40, 52, 60, 100, 200 is also adapted to determine evacuation plans specific to each personal UWB device in the building, based on the received position information of the plurality of personal UWB devices, and the obtained information about the facilities within the building. While there are personal UWB devices in the building, the EMS 40, 52, 60, 100, 200 is also adapted to define real-time guidance information specific to each personal UWB device in the building, said information comprising real-time guidance in which direction to move, based on the evacuation plans being specific to each personal UWB device in the building. While there are personal UWB devices in the building, the EMS 40, 52, 60, 100, 200 is also adapted to send said real-time guidance information via the UWB RTLS to the personal UWB devices in the building, providing individual guidance, to a person carrying a personal UWB device in the building, in which direction to move. While there are personal UWB devices in the building, the EMS 40, 52, 60, 100, 200 is also adapted to iterate the actions in the present paragraph until all persons carrying a personal UWB device have reached a safe place, based on updated position information of each personal UWB device.

The present disclosure also comprises a computer program for providing real-time evacuation information for evacuation of a building. The computer program comprises instructions which, when executed on at least one processor, cause the at least one processor to carry out the actions as mentioned above and/or presented in FIG. 3.

Figure 7:
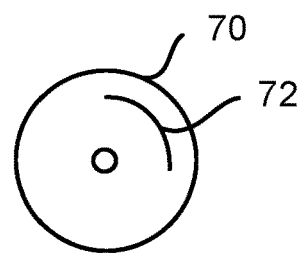
FIG. 7 schematically presents a computer-readable storage medium, according to an embodiment of the present disclosure.

FIG. 7 schematically presents a computer-readable storage medium 70, according to an embodiment of the present disclosure. The computer-readable storage medium 70 has thereon the computer program 72 as above.

Advantages of examples and/or embodiments of the present disclosure comprise:

The proposed evacuation management system can provide a real-time overview of a current emergency situation, in the form of the location of anybody, or anything, carrying the personal UWB devices.

It is a further advantage that the evacuation management system can be informed about the status of people carrying personal UWB devices.

In case of evacuation, the evacuation management system typically guides people in their movement inside a building by providing guidance information to the personal UWB devices, giving directions in which direction to move. In this respect, the movement of people may be considered to be controlled in real-time.

It is also advantageous that the evacuation management system can be informed about the status of the people carrying the personal UWB devices, and that there are several alternatives and options to deliver such information.

The personal UWB devices may moreover receive information in the form of voice information or information to be presented by visual interfaces, to be presented to the person carrying the personal UWB device. This would effectively assist people in finding their way to a safe place, and/or out of a building, thereby leaving emergency and/or danger zones.

The personal UWB devices, together with anchors with which they are communicating, serve as radio beacons that help rescue team to locate and find people within a building.

Information reaching the personal UWB devices may also be presented with light and/or sound alarms to call the attention or a person carrying said personal UWB device.

It is also an advantage that crowding or hindrance near or at emergency exits can be circumvented, by individually guiding people along functioning routes out of a building.

It is an advantage that trapped or injured people can be found, even in low visibility areas.

ABBREVIATIONS

EMS evacuation management system
CCTV closed-circuit television
NFC near-field communication
RTLS real-time localization system
UI user interface
UWB ultra-wide band

The invention claimed is:

1. A method of providing real-time evacuation information for evacuating a building, the method being performed by an evacuation management system (EMS) that is connected to an ultra-wide band (UWB) real-time localization system (RTLS), the method comprising:
receiving an alarm notification associated with the building;
obtaining information about facilities within the building;
validating the alarm notification by requesting confirmation of the alarm from an authorized user;
receiving position information of a plurality of personal UWB devices from the UWB RTLS, the position information measured by a plurality of anchors installed inside the building and connected to the UWB RTLS;
while there are personal UWB devices in the building, and based on the received position information:
determining evacuation plans specific to each personal UWB device in the building, based on the received position information of the plurality of personal UWB devices and the obtained information about the facilities within the building;

defining real-time guidance information specific to each personal UWB device in the building based on the evacuation plans being specific to each personal UWB device in the building, the guidance information comprising real-time guidance in which direction to move; and sending the real-time guidance information via the UWB RTLS to the personal UWB devices in the building, providing individual guidance to a person carrying a personal UWB device in the building regarding which direction to move; and iterating the obtaining, the receiving position information, the determining, the defining, and the sending until all persons carrying a personal UWB device have reached a safe place, based on updated position information of each personal UWB device.

2. The method of claim 1:
further comprising obtaining status information from the plurality of personal UWB devices;
wherein the determining the evacuation plan based on the obtained status information from the plurality of personal UWB devices.

3. The method of claim 1, further comprising validating the alarm notification based on the information obtained about facilities in the building.

4. The method of claim 1, further comprising, in response to validating the alarm notification, forwarding the alarm notification to one or more emergency services.

5. The method of claim 1:
further comprising receiving control input from a human operator;
wherein the defining real-time guidance that is specific to each personal UWB device is further based on the received control input from a human operator.

6. The method of claim 1:
further comprising accessing historical evacuation information from a database;
wherein the determining the evacuation plans which are personal UWB device specific is further based on the historical evacuation information.

7. An evacuation management system (EMS) operative to provide real-time evacuation information for evacuation of a building, the EMS being configured to be connected to an ultra-wide band (UWB) real-time localization system (RTLS) monitoring personal UWB devices, the EMS comprising:
an interface configured to:
receive an alarm notification associated with the building;
validate the alarm notification by requesting confirmation of the alarm from an authorized user;
obtain information about facilities within the building; and
iteratively receive position information of a plurality of personal UWB devices from the UWB RTLS, the position information measured by a plurality of anchors installed inside the building and connected to the UWB RTLS; and
control circuitry configured to:
iteratively determine whether there are personal UWB devices in the building based on the position information; and
while there are personal UWB devices in the building:
iteratively determine evacuation plans specific to each personal UWB device in the building based on the received position information of the plurality of personal UWB devices and the obtained information about the facilities within the building; and
iteratively define real-time guidance information specific to each personal UWB device in the building based on the evacuation plans being specific to each personal UWB device in the building, the guidance information comprising real-time guidance regarding which direction to move;
wherein the interface is further configured to iteratively send the real-time guidance information via the UWB RTLS to the personal UWB devices in the building, thereby providing individual guidance to a person carrying a personal UWB device in the building regarding which direction to move.

8. The EMS of claim 7:
wherein the interface further is configured to obtain status information from the plurality of personal UWB devices; and
wherein the control circuitry further is configured to determine the evacuation plan based on the obtained status information from the plurality of personal UWB devices.

9. The EMS of claim 7, wherein the control circuitry is further configured to validate the alarm notification based on the information obtained about facilities in the building.

10. The EMS of claim 7, wherein the control circuitry is further configured to, upon validating the alarm notification, forward the alarm notification to one or more emergency services.

11. The EMS of claim 7:
wherein the interface further is configured receive control input from a human operator; and
wherein the control circuitry further is configured to define real-time guidance specific to each personal UWB device based on the received control input from a human operator.

12. The EMS of claim 7:
further comprising a database configured to store the information about facilities in the building, and to store position information of the plurality of personal UWB devices from the UWB RTLS; and
wherein the control circuitry further is configured to:
access historical evacuation information from the database; and
determine the evacuation plans which are personal UWB device specific based on the historical evacuation information.

13. The EMS of claim 7, wherein the control circuitry further comprises an analytics engine configured to perform machine learning.

14. An evacuation system operative to provide real-time evacuation information for evacuation of a building, the evacuation system comprising:
an ultra-wide band (UWB) real-time localization system (RTLS); and
an evacuation management system (EMS) configured to be connected to the UWB RTLS, the EMS comprising:
an interface configured to:
receive an alarm notification associated with the building;
validate the alarm notification by requesting confirmation of the alarm from an authorized user;
obtain information about facilities within the building; and iteratively receive position information of a plurality of personal UWB devices from the UWB RTLS, the position information measured by a plurality of anchors installed inside the building and connected to the UWB RTLS; and control circuitry configured to:
iteratively determine whether there are personal UWB devices in the building based on the position information; and while there are personal UWB devices in the building:
iteratively determine evacuation plans specific to each personal UWB device in the building based on the received position information of the plurality of personal UWB devices and the obtained information about the facilities within the building; and iteratively define real-time guidance information specific to each personal UWB device in the building based on the evacuation plans being specific to each personal UWB device in the building, the guidance information comprising real-time guidance regarding which direction to move;

wherein the interface is further configured to iteratively send the real-time guidance information via the UWB RTLS to the personal UWB devices in the building, thereby providing individual guidance to a person carrying a personal UWB device in the building regarding which direction to move; and wherein the UWB RTLS is configured to monitor the location of the plurality of personal UWB devices.

* * * * *